(12) United States Patent
Suemura et al.

(10) Patent No.: US 11,177,050 B2
(45) Date of Patent: Nov. 16, 2021

(54) METHOD FOR INHIBITING OCCURRENCE OF CREEPING ELECTRICAL DISCHARGE

(71) Applicants: NISSAN CHEMICAL CORPORATION, Tokyo (JP); KYUSHU INSTITUTE OF TECHNOLOGY, Kitakyushu (JP)

(72) Inventors: Naohiko Suemura, Sodegaura (JP); Tomohisa Ishida, Sodegaura (JP); Masahiro Kozako, Kitakyushu (JP); Masayuki Hikita, Kitakyushu (JP); Kyunghoon Jang, Kitakyushu (JP); Takao Akahoshi, Kitakyushu (JP)

(73) Assignees: NISSAN CHEMICAL CORPORATION, Tokyo (JP); KYUSHU INSTITUTE OF TECHNOLOGY, Kitakyushu (JP)

( * ) Notice: Subject to any disclaimer, the term of this patent is extended or adjusted under 35 U.S.C. 154(b) by 0 days.

(21) Appl. No.: 16/314,631

(22) PCT Filed: Jun. 28, 2017

(86) PCT No.: PCT/JP2017/023726
§ 371 (c)(1),
(2) Date: Dec. 31, 2018

(87) PCT Pub. No.: WO2018/003844
PCT Pub. Date: Jan. 4, 2018

(65) Prior Publication Data
US 2019/0148031 A1   May 16, 2019

(30) Foreign Application Priority Data

Jul. 1, 2016 (JP) .............................. JP2016-132011
Mar. 3, 2017 (JP) .............................. JP2017-040998

(51) Int. Cl.
| | |
|---|---|
| H01B 3/40 | (2006.01) |
| H02B 13/045 | (2006.01) |
| H02G 5/06 | (2006.01) |
| C08L 63/00 | (2006.01) |
| H01B 3/30 | (2006.01) |

(52) U.S. Cl.
CPC ................ *H01B 3/40* (2013.01); *C08L 63/00* (2013.01); *H01B 3/30* (2013.01); *H02B 13/045* (2013.01); *H02G 5/06* (2013.01)

(58) Field of Classification Search
CPC ........................................................ H01B 3/30
See application file for complete search history.

(56) References Cited

U.S. PATENT DOCUMENTS

| | | | |
|---|---|---|---|
| 4,760,296 | A | 7/1988 | Johnston et al. |
| 2010/0029845 | A1 | 2/2010 | Suemura et al. |
| 2011/0172331 | A1 | 7/2011 | Suemura et al. |
| 2012/0247806 | A1 | 10/2012 | Choi et al. |

FOREIGN PATENT DOCUMENTS

| | | | |
|---|---|---|---|
| CN | 102732146 A | | 10/2012 |
| EP | 2 058 366 A1 | | 5/2009 |
| JP | S57-002361 A | | 1/1982 |
| JP | H11-297869 A | | 10/1999 |
| JP | 2004022831 A | * | 1/2004 |
| JP | 2004-250521 A | | 9/2004 |
| JP | 2006-057017 A | | 3/2006 |
| JP | 2006-325314 A | | 11/2006 |
| JP | 2008-274260 A | | 11/2008 |
| JP | 2009-140878 A | | 6/2009 |
| JP | 2012-110206 A | | 6/2012 |
| JP | 2016-031845 A | | 3/2016 |
| TW | 200904751 A | | 2/2009 |
| WO | 2009/008509 A1 | | 1/2009 |

OTHER PUBLICATIONS

Machine translation of JP-2004022831-A (Year: 2004).*
Machine translation of JPH11297869-A (Year: 1999).*
Aug. 22, 2017 International Search Report issued in International Patent Application No. PCT/JP2017/023726.
Feb. 5, 2020 Extended European Search Report issued in European Patent Application No. 17820198.4.
Apr. 27, 2020 Office Action issued in Chinese Patent Application No. 201780040668.0.
Nov. 25, 2020 Office Action issued in Taiwanese Application No. 106122065.
Sep. 15, 2021 Office Action issued in Japanese Patent Application No. 2018-525203.

* cited by examiner

*Primary Examiner* — Wenwen Cai
(74) *Attorney, Agent, or Firm* — Oliff PLC

(57) ABSTRACT

A method for preventing occurrence of creeping electrical discharge at a resin surface, the method being characterized by including dispersing nanosized inorganic fine particles in a resin, thereby preventing occurrence of creeping electrical discharge at the surface of a cured product of the resin.

5 Claims, 1 Drawing Sheet

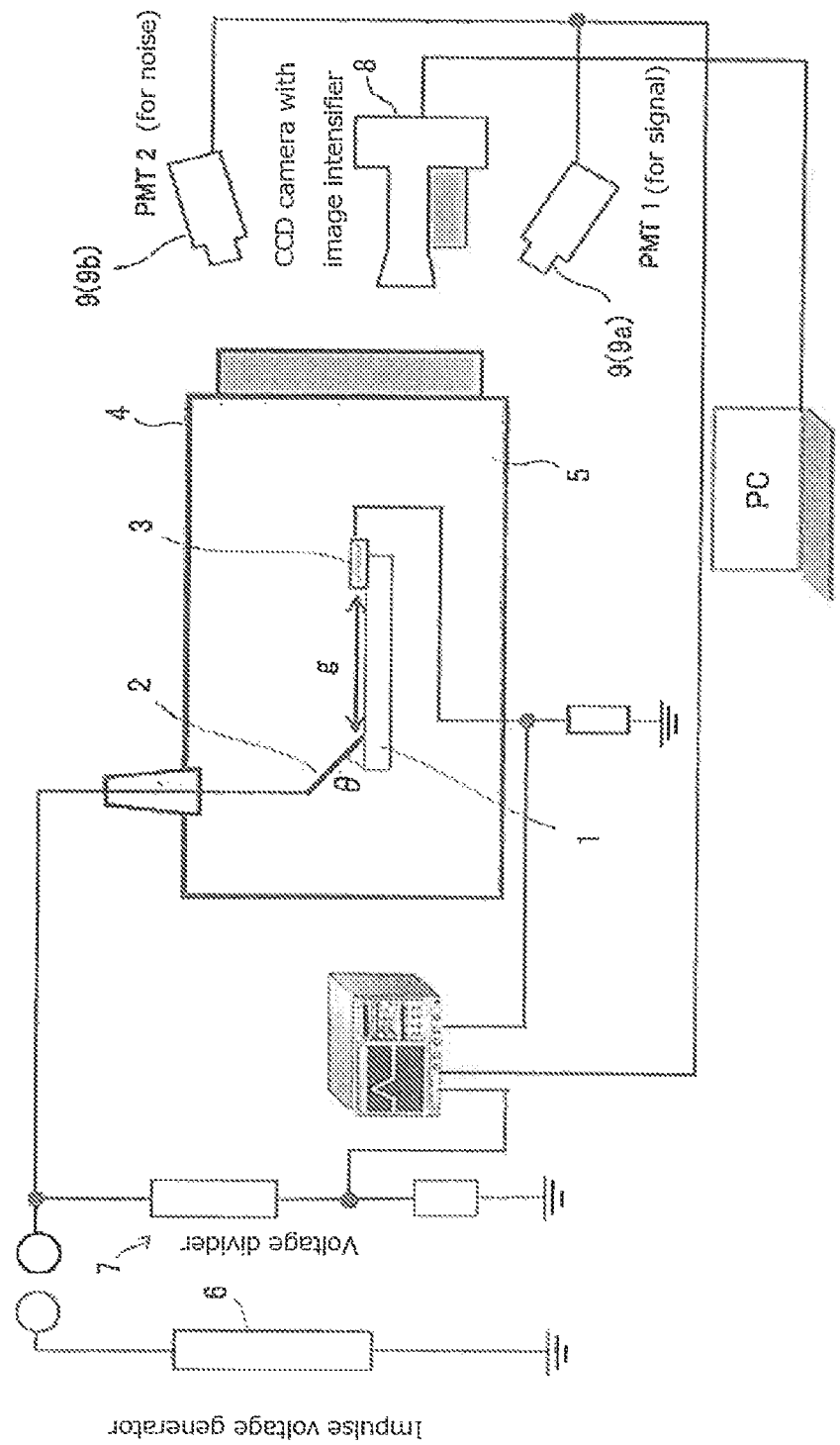

METHOD FOR INHIBITING OCCURRENCE OF CREEPING ELECTRICAL DISCHARGE

TECHNICAL FIELD

The present invention relates to a technique for preventing occurrence of creeping electrical discharge in an insulating material used for a high-voltage (high-power) device.

BACKGROUND ART

In a high-voltage (high-power) device, creeping electrical discharge due to high voltage is likely to occur at the surface of a solid insulating material. As used herein, the term "surface" refers to the interface between different phases, such as liquid/solid, gas/solid, and vacuum/solid phases. In this case, creeping electrical discharge does not occur in a solid phase, but occurs in any of liquid, gas, and vacuum phases.

Reported conventional techniques for preventing creeping electrical discharge at a resin surface include electric field relaxation by control of the dielectric constant of a solid insulating material that may cause creeping electrical discharge (in such a case, the dielectric constant of solid is decreased so as to match the dielectric constant of liquid, gas, or vacuum); electric field relaxation by means of spatial gradient distribution of dielectric constant; electric field relaxation by means of non-linear electrical conductivity; and an increase in creeping distance by providing the surface with irregularities. Thus, creeping electrical discharge has been conventionally prevented only by electric field relaxation or an increase in creeping distance (i.e., physical means).

PRIOR ART DOCUMENTS

Patent Documents

Patent Document 1: Japanese Patent Application Laid-Open (kokai) No. 2012-110206
Patent Document 2: Japanese Patent Application Laid-Open (kokai) No. 2016-031845

SUMMARY OF THE INVENTION

Problems to be Solved by the Invention

An object of the present invention is to establish a method for preventing occurrence of creeping electrical discharge at the surface of a cured resin product without relying on electric field relaxation of the cured resin product, which is a solid insulating material (i.e., without relying on a decrease in dielectric constant of the resin).

Means for Solving the Problems

The present invention has been accomplished on the basis of the finding that occurrence of creeping electrical discharge can be prevented at the surface of a cured resin product (i.e., a solid insulating material) by forming the cured resin product from a nano composite insulating material containing nanosized inorganic fine particles dispersed in a resin.

In order to achieve the aforementioned object, the present invention provides a method for preventing occurrence of creeping electrical discharge, the method being characterized by comprising dispersing nanosized inorganic fine particles in a resin, thereby preventing occurrence of creeping electrical discharge at the surface of a cured product of the resin.

The inorganic fine particles may be fine particles of silica, alumina, titania, zirconia, zinc oxide, tin oxide, antimony oxide, iron oxide, magnesium oxide, or a composite oxide containing any of these oxides as a main component.

In general, "nanosized particles" are particles on the order of nanometers (nm); i.e., particles having a size of 1 to several hundreds of nm. However, in the present invention, "nanosized particles" are particles having a mean particle size of 1 to 400 nm. As described below, the mean particle size is determined on the basis of specific surface area.

The inorganic fine particles used in the present invention have a mean particle size of preferably 5 to 200 nm, particularly preferably 5 to 100 nm. The resin used in the present invention is a thermosetting resin generally used in the art, such as epoxy resin. The nano composite contains the inorganic fine particles in an amount of 0.1 to 50 mass %.

Effects of the Invention

The present invention can increase the voltage at which creeping electrical discharge occurs at the surface of a cured resin product (i.e., a solid insulating material) without electric field relaxation of the solid insulating material or a physical increase in creeping distance. The cured resin product is suitable for use in, for example, an insulating spacer of a gas insulated switchgear (GIS) or a coating resin for a pressboard of an oil-immersed transformer.

BRIEF DESCRIPTION OF THE DRAWINGS

FIG. 1 A schematic illustration of a creeping electrical discharge measuring system.

MODES FOR CARRYING OUT THE INVENTION

Examples of the insulating resin used in the present invention include thermosetting resins, such as epoxy resin, polyimide resin, polyamide-imide resin, and silicone. Other examples include thermoplastic resins, such as polyethylene and polypropylene.

Examples of the epoxy resin used in the present invention include, but are not particularly limited to, bisphenol A epoxy resin, bisphenol F epoxy resin, and alicyclic epoxy resin. In general, such an epoxy resin is mixed with, for example, a curing agent, and then the mixture is formed into a desired shape through casting and thermal curing.

Examples of the curing agent for the epoxy resin used in the present invention include a phenolic resin, an amine compound, a polyamide resin, an imidazole compound, a polymercaptan, and an acid anhydride.

Examples of the phenolic resin include phenol novolac resin and cresol novolac resin.

Examples of the amine compound include piperidine, N,N-dimethylpiperazine, triethylenediamine, 2,4,6-tris(dimethylaminomethyl)phenol, benzyldimethylamine, 2-(dimethylaminomethyl)phenol, diethylenetriamine, triethylenetetramine, tetraethylenepentamine, diethylaminopropylamine, N-aminoethylpiperazine, di(1-methyl-2-aminocyclohexyl)methane, menthenediamine, isophoronediamine, diaminodicyclohexylmethane, 1,3-diaminomethylcyclohexane, xylenediamine, m-phenylenediamine, diaminodiphenylmethane, and diaminodiphenylsulfone. Of these, preferred are, for example, diethylenetriamine, triethylenetetramine, tetraethylenepentamine, diethylaminopropylamine, N-aminoethylpiperazine, di(1-methyl-2-aminocyclohexyl)methane, menthenediamine, isophoronediamine, and diaminodicyclohexylmethane, which are in liquid form.

The polyamide resin is polyamide-amine produced through condensation between dimer acid and polyamine and having primary and secondary amines in the molecule.

Examples of the imidazole compound include 2-methylimidazole, 2-ethyl-4-methylimidazole, 1-cyanoethyl-2-undecylimidazolium trimellitate, and epoxy-imidazole adducts.

The polymercaptan has, for example, a structure including a polypropylene glycol chain and a mercaptan group present at the chain end, or a structure including a polyethylene glycol chain and a mercaptan group present at the chain end. The polymercaptan is preferably in liquid form.

The acid anhydride used in the present invention is preferably an anhydride of a compound having a plurality of carboxyl groups in one molecule. Examples of such an acid anhydride include phthalic anhydride, trimellitic anhydride, pyromellitic anhydride, benzophenonetetracarboxylic anhydride, ethylene glycol bistrimellitate, glycerol tristrimellitate, maleic anhydride, tetrahydrophthalic anhydride, methyltetrahydrophthalic anhydride, endomethylenetetrahydrophthalic anhydride, methylendomethylenetetrahydrophthalic anhydride, methylbutenyltetrahydrophthalic anhydride, dodecenylsuccinic anhydride, hexahydrophthalic anhydride, methylhexahydrophthalic anhydride, succinic anhydride, methylcyclohexenedicarboxylic anhydride, and chlorendic anhydride.

Of these, preferred are methyltetrahydrophthalic anhydride, methylendomethylenetetrahydrophthalic anhydride, methylbutenyltetrahydrophthalic anhydride, dodecenylsuccinic anhydride, and methylhexahydrophthalic anhydride, which are in liquid form at ambient temperature and ambient pressure. Such a liquid-form acid anhydride has a viscosity of about 10 mPa to about 1,000 mPa as measured at 25° C.

A curing accelerator may be appropriately used in combination for production of the aforementioned cured product. Examples of the curing accelerator include organophosphorus compounds, such as triphenylphosphine and tributylphosphine; quaternary phosphonium salts, such as ethyltriphenylphosphonium bromide and methyltriphenylphosphonium diethyl phosphate; 1,8-diazabicyclo(5,4,0)undecan-7-ene; a salt of 1,8-diazabicyclo(5,4,0)undecan-7-ene and octylic acid; zinc octylate; quaternary ammonium salts, such as tetrabutylammonium bromide; and tertiary amines, such as dimethylbenzylamine. Such a curing accelerator may be incorporated in an amount of 0.001 to 0.1 parts by mass relative to one part by mass of the curing agent.

The nanosized inorganic fine particles used in the present invention are preferably metal oxide fine particles from the viewpoints of insulation property and dispersibility. The metal oxide fine particles are preferably, for example, fine particles of silica, alumina, titania, zirconia, zinc oxide, tin oxide, antimony oxide, iron oxide, magnesium oxide, or a composite oxide containing any of these oxides as a main component. Of these, silica fine particles are preferred as the inorganic fine particles used in the present invention, since silica has a low dielectric constant of about 4 and exhibits a low thermal expansion coefficient.

Silica used in the present invention is in the form of particles. Silica particles have a mean particle size of preferably 200 nm or less (e.g., 5 nm to 200 nm), more preferably 5 nm to 100 nm, 10 nm to 100 nm, or 10 nm to 80 nm. A particle size of more than 100 nm leads to a less pronounced effect of preventing creeping electrical discharge.

The mean particle size of silica particles used in the present invention is calculated from the specific surface area as measured through the nitrogen absorption method.

Particularly preferably, the present invention involves the use of colloidal silica having the aforementioned mean particle size. The colloidal silica may be silica sol. The silica sol serving as a raw material may be an aqueous silica sol prepared from an aqueous sodium silicate solution by any known method, or an organosilica sol prepared by replacing water (i.e., a dispersion medium) in the aqueous silica sol with an organic solvent. Alternatively, the silica sol serving as a raw material may be a silica sol prepared by hydrolysis of an alkoxysilane (e.g., methyl silicate or ethyl silicate) in an organic solvent (e.g., alcohol) in the presence of a catalyst (e.g., an alkali catalyst, such as ammonia, an organic amine compound, or sodium hydroxide) and subsequent condensation, or an organosilica sol prepared by replacing the organic solvent in the silica sol with another organic solvent.

Examples of the organic solvent used for the aforementioned organosilica sol include an alcohol, an ether, a ketone, an ester, an amide, a hydrocarbon, and a nitrile.

Examples of the alcohol include methanol, ethanol, 1-propanol, 2-propanol, 1-butanol, isobutyl alcohol, 2-butanol, ethylene glycol, glycerin, propylene glycol, triethylene glycol, polyethylene glycol, benzyl alcohol, 1,5-pentanediol, and diacetone alcohol.

Examples of the ether include diethyl ether, dibutyl ether, tetrahydrofuran, dioxane, ethylene glycol monomethyl ether, ethylene glycol monopropyl ether, propylene glycol monomethyl ether, propylene glycol monoethyl ether, diethylene glycol monomethyl ether, diethylene glycol monoethyl ether, and diethylene glycol monobutyl ether.

Examples of the ketone include acetone, methyl ethyl ketone, 2-pentanone, 3-pentanone, methyl isobutyl ketone, 2-heptanone, and cyclohexanone.

Examples of the ester include ethyl formate, methyl acetate, ethyl acetate, propyl acetate, butyl acetate, ethylene glycol monoethyl ether acetate, ethylene glycol monobutyl ether acetate, and propylene glycol monomethyl ether acetate.

Examples of the amide include acetamide, N,N-dimethylformamide, N,N-dimethylacetamide, and N-methylpyrrolidone.

Examples of the hydrocarbon include n-hexane, cyclohexane, benzene, toluene, xylene, solvent naphtha, and styrene. Examples of halogenated hydrocarbons include dichloromethane and trichloroethylene.

Examples of the nitrile include acetonitrile, glutaronitrile, methoxyacetonitrile, propionitrile, and benzonitrile.

Examples of commercially available products of the aforementioned organosilica sol include, but are not limited to, MA-ST-S (trade name, silica sol dispersed in methanol, manufactured by Nissan Chemical Industries, Ltd.), MT-ST (trade name, silica sol dispersed in methanol, manufactured by Nissan Chemical Industries, Ltd.), MA-ST-UP (trade name, silica sol dispersed in methanol, manufactured by Nissan Chemical Industries, Ltd.), MA-ST-M (trade name, silica sol dispersed in methanol, manufactured by Nissan Chemical Industries, Ltd.), MA-ST-L (trade name, silica sol dispersed in methanol, manufactured by Nissan Chemical Industries, Ltd.), IPA-ST-S (trade name, silica sol dispersed in isopropanol, manufactured by Nissan Chemical Industries, Ltd.), IPA-ST (trade name, silica sol dispersed in isopropanol, manufactured by Nissan Chemical Industries, Ltd.), IPA-ST-UP (trade name, silica sol dispersed in isopropanol, manufactured by Nissan Chemical Industries, Ltd.), IPA-ST-L (trade name, silica sol dispersed in isopropanol, manufactured by Nissan Chemical Industries, Ltd.), IPA-ST-ZL (trade name, silica sol dispersed in isopropanol, manufactured by Nissan Chemical Industries, Ltd.), NPC-ST-30 (trade name, silica sol dispersed in n-propyl cellosolve, manufactured by Nissan Chemical Industries, Ltd.), PGM-ST (trade name, silica sol dispersed in 1-methoxy-2-propanol, manufactured by Nissan Chemical Industries, Ltd.), DMAC-ST (trade name, silica sol dispersed in dimethylacetamide, manufactured by Nissan Chemical Industries, Ltd.), XBA-ST (trade name, silica sol dispersed in a solvent mixture of xylene and n-butanol, manufactured by Nissan Chemical Industries, Ltd.), EAC-ST (trade name, silica sol dispersed in ethyl acetate, manufactured by Nissan Chemical Industries, Ltd.), PMA-ST (trade name, silica sol dispersed in propylene glycol monomethyl ether acetate, manufactured by Nissan Chemical Industries, Ltd.), MEK-ST (trade name, silica sol dispersed in methyl ethyl ketone, manufactured by Nissan Chemical Industries, Ltd.), MEK-ST-UP (trade name, silica sol dispersed in methyl ethyl ketone, manufactured by Nissan Chemical Industries, Ltd.), MEK-ST-L (trade name, silica sol dispersed in methyl ethyl ketone, manufactured by Nissan Chemical Industries, Ltd.), and MIBK-ST (trade name, silica sol dispersed in methyl isobutyl ketone, manufactured by Nissan Chemical Industries, Ltd.).

The surfaces of silica particles used in the present invention may be hydrophobicized. Examples of the agent used for hydrophobization include a silazane, a siloxane, an alkoxysilane, a partially hydrolyzed product of any of these, or an oligomer (dimer to pentamer) prepared through polymerization of any of these.

Examples of the silazane include hexamethyldisilazane and hexaethyldisilazane.

Examples of the siloxane include hexamethyldisiloxane, 1,3-dibutyltetramethyldisiloxane, 1,3-diphenyltetramethyldisiloxane, 1,3-divinyltetramethyldisiloxane, hexaethyldisiloxane, and 3-glycidoxypropylpentamethyldisiloxane.

Examples of the alkoxysilane include trimethylmethoxysilane, trimethylethoxysilane, trimethylpropoxysilane, phenyldimethylmethoxysilane, chloropropyldimethylmethoxysilane, dimethyldimethoxysilane, methyltrimethoxysilane, tetramethoxysilane, tetraethoxysilane, tetrapropoxysilane, tetrabutoxysilane, ethyltrimethoxysilane, dimethyldiethoxysilane, propyltriethoxysilane, n-butyltrimethoxysilane, n-hexyltrimethoxysilane, n-octyltriethoxysilane, n-octylmethyldiethoxysilane, n-octadecyltrimethoxysilane, phenyltrimethoxysilane, phenylmethyldimethoxysilane, phenethyltrimethoxysilane, dodecyltrimethoxysilane, n-octadecyltriethoxysilane, phenyltrimethoxysilane, diphenyldimethoxysilane, vinyltrimethoxysilane, vinyltriethoxysilane, vinyltris(βmethoxyethoxy)silane, γ-methacryloxypropyltrimethoxysilane, γ-acryloxypropyltrimethoxysilane, γ-(methacryloxypropyl)methyldimethoxysilane, γ-methacryloxypropylmethyldiethoxysilane, γ-methacryloxypropyltriethoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, N-β(aminoethyl)γ-(aminopropyl)methyldimethoxysilane, N-β(aminoethyl)γ-(aminopropyl)trimethoxysilane, N-β(aminoethyl)γ-(aminopropyl)triethoxysilane, γ-aminopropyltrimethoxysilane, γ-aminopropyltriethoxysilane, N-phenyl-γ-aminopropyltrimethoxysilane, γ-mercaptopropyltrimethoxysilane, 3-isocyanatopropyltriethoxysilane, trifluoropropyltrimethoxysilane, heptadecatrifluoropropyltrimethoxysilane, n-decyltrimethoxysilane, dimethoxydiethoxysilane, bis(triethoxysilyl)ethane, and hexaethoxydisiloxane.

In the present invention, the amount of nanosized silica particles contained in the resin is, for example, 0.1 to 50 mass %, preferably 0.2 to 30 mass % or 0.5 to 30 mass %. In order to further prevent creeping electrical discharge at the resin surface, the amount of nanosized silica particles is preferably 0.5 to 20 mass % or 1 to 20 mass %, more preferably 1 to 15 mass % or 2 to 15 mass %.

When the amount of nanosized silica particles is more than 50 mass %, the dielectric constant of the cured resin product increases, resulting in reduced effect of preventing electrical discharge, whereas when the amount of nanosized silica particles is less than 0.1 mass %, the effect of addition of silica is reduced, resulting in failure to achieve the effect of preventing electrical discharge at the resin surface.

The aforementioned organosilica sol is mixed with, for example, an epoxy resin, and the solvent is removed from the mixture, to thereby prepare an epoxy resin containing nanosized silica particles dispersed therein. The epoxy resin is appropriately mixed with a curing agent, and then the mixture is cured by means of, for example, casting and thermal curing, to thereby form a desired insulating resin product.

EXAMPLES (Provision of Materials)

Silica particles having a mean particle size of 12 to 500 nm were dispersed in bisphenol A diglycidyl ether JER828 (manufactured by Mitsubishi Chemical Corporation, epoxy value: 185 g/eq.), to thereby prepare a silica sol dispersed in epoxy monomer having a silica concentration of 30.5 mass %, Silica particles having a mean particle size of 500 nm were ADMAFINE SO-C2 (manufactured by Admatechs Company Limited). The specific surface area of silica powder (dried at 300° C.) was measured by means of a specific surface area meter Monosorb (registered trademark) MS-16 (manufactured by Yuasa Ionics), and the mean particle size was calculated by use of the following formula: mean particle size (nm)=2720/specific surface area ($m^2$/g).

TABLE 1

| | Particle size (nm) | Epoxy resin | $SiO_2$ (%) |
|---|---|---|---|
| Monomer sol 1 | 12 | Bisphenol A | 30.5 |
| Monomer sol 2 | 22 | Bisphenol A | 30.5 |
| Monomer sol 3 | 45 | Bisphenol A | 30.5 |
| Monomer sol 4 | 80 | Bisphenol A | 30.5 |
| Monomer sol 5 | 500 | Bisphenol A | 30.5 |

Examples 1 to 10 and Comparative Examples 1 and 2

Each silica sol dispersed in epoxy monomer shown in Table 1 was mixed with an acid anhydride (RIKACID MH-700, manufactured by New Japan Chemical Co., Ltd.) and a reaction accelerator (dimethylbenzylamine, Tokyo Chemical Industry Co., Ltd.) in proportions shown in Table 2, to thereby prepare an epoxy resin curing composition. The epoxy resin curing composition was applied to a casting plate (glass plate (3 mm in thickness) coated with release film PL #400 (manufactured by Futamura Chemical Co., Ltd.)) and thermally treated under the following curing conditions: at 70° C. for two hours, at 90° C. for two hours, and at 150° C. for eight hours, to thereby produce an epoxy cured resin product.

TABLE 2

|  | Monomer sol (g) |  | Epoxy resin (g) | Acid anhydride (g) | Accelerator (g) | SiO$_2$ (%) |
|---|---|---|---|---|---|---|
| Example 1 | Monomer sol 1 | 5.0 | 23.6 | 21.7 | 0.3 | 3 |
| Example 2 | Monomer sol 2 | 5.0 | 23.4 | 21.6 | 0.3 | 3 |
| Example 3 | Monomer sol 2 | 16.5 | 13.6 | 19.9 | 0.2 | 10 |
| Example 4 | Monomer sol 3 | 1.7 | 26.6 | 22.4 | 0.3 | 1 |
| Example 5 | Monomer sol 3 | 5.0 | 23.5 | 21.7 | 0.3 | 3 |
| Example 6 | Monomer sol 3 | 8.3 | 20.8 | 21.3 | 0.3 | 5 |
| Example 7 | Monomer sol 3 | 16.5 | 13.5 | 20.0 | 0.2 | 10 |
| Example 8 | Monomer sol 3 | 32.5 | 0.0 | 17.9 | 0.2 | 20 |
| Example 9 | Monomer sol 4 | 5.0 | 23.7 | 21.9 | 0.3 | 3 |
| Example 10 | Monomer sol 4 | 16.5 | 13.5 | 20.0 | 0.2 | 10 |
| Comp. Ex. 1 | None |  | 0.0 | 55.0 | 44.4 | 0.6 | 0 |
| Comp. Ex. 2 | Monomer sol 5 | 5.0 | 23.6 | 21.9 | 0.3 | 3 |

(Method of Measuring Creeping Electrical Discharge)

FIG. 1 schematically illustrates a creeping electrical discharge measuring system. This system is used to obtain a time waveform and a luminous image during application of a voltage, to thereby calculate occurrence of creeping electrical discharge.

A sample 1 was each of the epoxy cured resin products produced in Examples 1 to 10. The sample 1 has a thickness of 3 mm.

As shown in FIG. 1, a needle electrode 2 and a plate electrode 3 were disposed on the surface of the sample 1 so as to achieve a gap length of 50 mm. The sample 1 and a electrode system including the needle electrode 2 and the plate electrode 3 were placed in a test container 4. The test container 4 was filled with mineral oil 5 so that the sample 1 and the electrode system were immersed in the mineral oil 5.

The needle electrode 2, having a diameter of 1 mm and a tip curvature radius of 10 m, was inclined at an angle θ of 30° with respect to the surface of the sample 1. The needle electrode 2 was connected to an impulse voltage generator 6, and the plate electrode 3 was grounded via a resistor of 50Ω. A positive standard lightning impulse voltage (1.2 s/50 µs) was applied at intervals of one minute to the needle electrode 2 via a voltage divider 7 from 35 kV to 75 kV at a step of 5 kV, and the occurrence of creeping electrical discharge was determined by means of a CCD camera 8 equipped with an image intensifier. Three pieces of the sample 1 were provided, and each piece was tested five times at each voltage (i.e., 15 runs for each voltage), to thereby calculate occurrence of creeping electrical discharge.

The relative dielectric constant of the sample 1 was evaluated by means of a dielectric constant meter.

Table 3 shows conditions of the prepare samples, the results of measurement of the relative dielectric constant of each sample, and the results of the creeping electrical discharge test. As shown in Table 3, an increase in the amount of added silica fine particles leads to an increase in relative dielectric constant. In the samples other than the sample containing silica fine particles having a particle size of 500 nm, the occurrence of electrical discharge decreases, and the voltage at the occurrence of electrical discharge increases. In the samples other than the sample containing silica fine particles having a particle size of 500 nm, the voltage at 100% occurrence of electrical discharge increased by 5 to 15 kV. Thus, the technique provided by the present invention can prevent the occurrence of creeping electrical discharge at the resin surface despite an approximate invariance or increase in the relative dielectric constant of the resin.

TABLE 3

|  | Silica particle size [nm] | Silica content [wt %] | Relative dielectric constant (@100 kHz) | Occurrence [%] of electric discharge at 35 kV | Voltage [kV] at 100% Occurrence of electric discharge |
|---|---|---|---|---|---|
| Example 1 | 12 | 3 | 3.46 | 33 | 50 |
| Example 2 | 22 | 3 | 3.50 | 20 | 50 |
| Example 3 |  | 10 | 3.58 | 33 | 45 |
| Example 4 | 45 | 1 | 3.48 | 7 | 50 |
| Example 5 |  | 3 | 3.51 | 0 | 50 |
| Example 6 |  | 5 | 3.56 | 33 | 55 |
| Example 7 |  | 10 | 3.59 | 0 | 55 |
| Example 8 |  | 20 | 3.75 | 40 | 50 |
| Example 9 | 80 | 3 | 3.53 | 33 | 45 |
| Example 10 |  | 10 | 3.60 | 55 | 50 |
| Comp. Ex. 1 | No silica | 0 | 3.47 | 73 | 40 |
| Comp. Ex. 2 | 500 | 3 | 3.58 | 73 | 40 |

(Provision of Materials)

Silica particles having a mean particle size of 130 nm were dispersed in bisphenol A diglycidyl ether JER828 (manufactured by Mitsubishi Chemical Corporation, epoxy value: 185 g/eq.), to thereby prepare a silica sol dispersed in epoxy monomer having a silica concentration of 30.5 mass % (monomer sol 6).

TABLE 4

|  | Particle size | Epoxy resin | SiO$_2$ (%) |
|---|---|---|---|
| Monomer sol 6 | 130 nm | Bisphenol A | 30.5 |

Cured products of Examples 11 and 12 and Referential Example 1 were produced under the same conditions as in Examples 1 to 10 (the proportions of materials: described below).

TABLE 5

|  | Monomer sol (g) |  | Epoxy resin (g) | Acid anhydride (g) | Accelerator (g) | SiO$_2$ (%) |
|---|---|---|---|---|---|---|
| Example 11 | Monomer sol 3 | 0.16 | 26.8 | 21.7 | 0.3 | 0.1 |
| Example 12 | Monomer sol 3 | 0.81 | 26.3 | 21.7 | 0.3 | 0.5 |
| Ref. Ex. 1 | Monomer sol 6 | 5.0 | 23.5 | 21.7 | 0.3 | 3.0 |

(Measurement of Creeping Electrical Discharge)

The aforementioned creeping electrical discharge measuring system was used, and the occurrence of creeping electrical discharge was determined in the cured products of Examples 1, 2, 4, 5, 9, 11, and 12, Comparative Examples 1 and 2, and Referential Example 1 by means of a photomultiplier tube 9. The photomultiplier tube 9 included a tube for signal 9a and a tube for noise 9b.

TABLE 6

|  | Silica particle size [nm] | Silica content [wt %] | Relative dielectric constant (@100 kHz) | Occurrence [%] of electric discharge at 35 kV | Voltage [kV] at 100% Occurrence of electric discharge |
|---|---|---|---|---|---|
| Example 1 | 12 | 3 | 3.46 | 31 | 50 |
| Example 2 | 22 | 3 | 3.50 | 20 | 50 |
| Example 11 | 45 | 0.1 | 3.37 | 53 | 40 |
| Example 12 |  | 0.5 | 3.34 | 40 | 45 |
| Example 4 |  | 1 | 3.48 | 27 | 45 |
| Example 5 |  | 3 | 3.51 | 40 | 50 |
| Example 9 | 80 | 3 | 3.53 | 31 | 50 |
| Comp. Ex. 1 | No silica | 0 | 3.47 | 73 | 40 |
| Comp. Ex. 2 | 500 | 3 | 3.58 | 73 | 40 |
| Ref. Ex. 1 | 130 | 3 | 3.60 | 80 | 40 |

Table 6 shows sample conditions, the results of measurement of the relative dielectric constant of each sample, and the results of the creeping electrical discharge test. As shown in Table 6, in the samples other than the samples containing silica fine particles having a particle size of 130 nm or more, the relative occurrence of electrical discharge decreases, and the voltage at the occurrence of electrical discharge increases, as compared with the case of Comparative Example 1 (free of silica). In the samples other than the samples containing silica fine particles having a particle size of 130 nm or more, the voltage at 100% occurrence of electrical discharge increased by 5 to 10 kV. Thus, the technique provided by the present invention can prevent the occurrence of creeping electrical discharge at the resin surface despite an approximate invariance or increase in the relative dielectric constant of the resin.

INDUSTRIAL APPLICABILITY

The use of the present invention can increase the voltage at which creeping electrical discharge occurs at the surface of a solid insulating material without electric field relaxation of the solid insulating material or a physical increase in creeping distance. The solid insulating material is suitable for use in, for example, an insulating spacer of a gas insulated switchgear (GIS) or a coating resin for a pressboard of an oil-immersed transformer.

DESCRIPTION OF REFERENCE NUMERALS

1. Sample
2. Needle electrode
3. Plate electrode
4. Test container
5. Mineral oil
6. Impulse voltage generator
7. Voltage divider
8. Camera
9. Photomultiplier tube
9a. Photomultiplier tube for signal
9b. Photomultiplier tube for noise

The invention claimed is:

1. A method for preventing occurrence of creeping electrical discharge at the surface of an insulating material comprising:
dispersing nanosized silica particles in an epoxy resin to form a mixture,
adding a curing agent to the mixture to form a curing composition,
applying the curing composition on a pressboard of an oil-immersed transformer to form
a coating layer on the pressboard, and
curing the coating layer to form the insulating material.

2. A method according to claim 1, wherein the epoxy resin is selected from the group consisting of bisphenol A epoxy resin, bisphenol F epoxy resin, and alicyclic epoxy resin.

3. A method according to claim 1, wherein the amount of the nanosized silica particles is 0.1 to 50 mass %.

4. A method according to claim 1, wherein the nanosized silica particles have a mean particle size of 5 to 100 nm.

5. A method according to claim 2, wherein the nanosized silica particles have a mean particle size of 5 to 100 nm.

* * * * *